US005938770A

United States Patent [19]

Kim

[11] Patent Number: 5,938,770

[45] Date of Patent: Aug. 17, 1999

[54] DISPLAY APPARATUS FOR COMPUTER SYSTEM

[75] Inventor: Yong-Hee Kim, Kyungki-do, Rep. of Korea

[73] Assignee: SamSung Electronics Co., Ltd., Kyungki-do, Rep. of Korea

[21] Appl. No.: 08/897,760

[22] Filed: Jul. 21, 1997

[30] Foreign Application Priority Data

Jul. 19, 1996 [KR] Rep. of Korea .......................... 96-29397

[51] Int. Cl.[6] .......................................... G06F 1/26

[52] U.S. Cl. ............................ 713/300; 713/340; 345/212

[58] Field of Search .......................... 395/750.01, 750.03, 395/750.05, 750.06, 750.08; 345/212, 214; 307/31

[56] References Cited

U.S. PATENT DOCUMENTS

| | | | |
|---|---|---|---|
| 5,475,271 | 12/1995 | Shibasaki et al. | 307/31 |
| 5,481,732 | 1/1996 | Shahbazi | 395/750.05 |
| 5,483,656 | 1/1996 | Oprescu et al. | 395/750.03 |
| 5,514,859 | 5/1996 | Seigel | 235/462.15 |
| 5,522,081 | 5/1996 | Carls | 395/750.07 |
| 5,560,022 | 9/1996 | Dunstan et al. | 395/750.01 |
| 5,586,333 | 12/1996 | Choi et al. | 395/750.03 |
| 5,603,040 | 2/1997 | Frager et al. | 395/750.06 |
| 5,606,704 | 2/1997 | Pierce et al. | 395/750.04 |
| 5,640,573 | 6/1997 | Gephardt et al. | 395/750.08 |

*Primary Examiner*—Gopal C. Ray
*Attorney, Agent, or Firm*—Robert E. Bushnell, Esq.

[57] ABSTRACT

A computer monitor in which USB devices connected thereto can be operated with a host power supply voltage provided through host-connected hub ports, even though a power supply voltage from a power supply of the monitor has been cut off. The monitor detects when a power supply voltage to USB devices connected thereto is beyond a rated voltage, and shuts off an abnormal voltage of more than the rated voltage to the USB devices so as to prevent them from being damaged due to the abnormal voltage.

20 Claims, 15 Drawing Sheets

DISPLAY APPARATUS FOR COMPUTER SYSTEM

This application makes reference to, incorporates the same herein, and claims all benefits accruing under 35 U.S.C. §119 from an application for DISPLAY APPARATUS FOR USE WITH COMPUTER SYSTEM earlier filed in the Korean Industrial Property Office on the day of Jul. 19, 1996 and there duly assigned Ser. No. 29397/1996, a copy of which application is annexed hereto.

BACKGROUND OF THE INVENTION

1. Field of the Invention

The present invention relates to a display apparatus for use with a computer system, and more particularly to a computer monitor for supplying a power supply voltage from an internal power supply therein to computer peripherals via universal serial bus USB hubs.

2. Description of the Related Art

A personal computer serving as a host may have an associated monitor serving as a display apparatus, a keyboard and a printer, a light pen or a plotter. The monitor is connected to the computer via a video cable and the computer provides video signals and the overall information required to control the monitor through the video cable along with information indicative of the monitor processed results from the monitor.

In addition to the keyboard and the monitor, if other peripheral devices, such as a printer, a light pen, a plotter or the like, are connected to the computer, it is complicated to connect the computer to the peripheral devices. Also, since the computer is not provided with a plug and play function, it is difficult for a user to connect the peripheral devices to the computer. To solve the above described problems, a universal serial bus (USB) system has been developed.

A monitor circuit not having a USB system has five main sections, a power supply, a video signal processor, a horizontal/vertical synchronization signal processor, a monitor controller and a CRT (cathode ray tube).

The monitor may also have an audio unit for generating an audio signal and a voice input unit for converting an audio signal into an electrical signal.

Such a monitor has the above described problem such as the difficulty of use for PC peripheral expansion and the like. Also, the monitor does not have connectors for communicating with the peripheral devices, such that plug and play functions can not be performed.

In order to solve the above described problem, an earlier invention by the same inventor as that of the present invention adds a hub system used for expansion of computer peripherals. The hub system incorporated into the computer monitor comprises three main sections, a USB system controller, a power switch and a plurality of input/output ports.

The controlling operation is performed in the USB controller. The USB controller receives and analyzes a power control signal from the computer system and the control provides a power switching control signal to the power switch which is composed of a multiplexer circuit and a microcomputer. The power switch designates corresponding ports of the downstream ports in response to the power switching control signal so that power from the power supply can be supplied through the designated ports. The USB controller checks whether the voltage at the designated port is above the limit value of voltage and if so, the control provides an abnormal voltage indicating signal to the computer system and the computer system receives the abnormal voltage indicating signal and generates a cut-off control signal. The cut-off control signal is provided to the computer monitor so that power supply through the designated downstream ports of the monitor is cut off.

In the above described computer monitor; when the power supply voltage is cutoff and the power supply of the monitor, during the power-off of the monitor during the power saving mode, a power supply voltage provided from the power supply or the hub port connected to the host is not supplied to the USB devices which are respectively connected through the hub ports connected to the USB controller. Thus, the USB devices are not operated.

The following patents each disclose features in common with the present invention but do not teach or suggest the specifically recited computer monitor for supplying a power supply voltage from an internal power supply to computer peripherals via a universal serial bus hub as in the present invention: U.S. Pat. No. 5,606,704 to Pierce et al., entitled Active Power Down For PC Card I/O Applications, U.S. Pat. No. 5,640,573 to Gephardt et al, entitled Power Management Message Bus For Integrated Processor, U.S. Pat. No. 5,603,040 to Frager et al, entitled Power Management Control Unit For A Computer Peripheral, U.S. Pat. No. 5,586,333 to Choi et al., entitled Method And Control Apparatus For Generating Power Management Signal Of Computer Peripheral Equipment In A Computer System, U.S. Pat. No. 5,560,022 to Dunstan et al., entitled Power Management Coordinator System And Interface, U.S. Pat. No. 5,522,081 to Carls, entitled Drive Current Detection And Optimization Circuit For Computer Systems, U.S. Pat. No. 5,514,859 to Seigel, entitled Power And Data Interface For Peripheral Devices, U.S. Pat. No. 5,483,656 to Oprescu et al., entitled System For Managing Power Consumption Of Devices Coupled To A Common Bus, and U.S. Pat. No. 5,475,271 to Shibasaki et al., entitled Power Source Control System For Electronic Device And Expansion Unit Connected Thereto.

SUMMARY OF THE INVENTION

It is therefore a main object of the present invention to provide a computer monitor in which USB devices connected thereto can be operated with a host power supply voltage provided through host-connected hub ports, even though a voltage from a power supply of the monitor has been cut off.

It is another object of the present invention to provide a computer monitor which detects when a power supply voltage to USB devices connected thereto is beyond a rated voltage, and shuts off an abnormal voltage of more than the rated voltage to a the USB devices so as to prevent the USB devices from being damaged due to the abnormal voltage.

According to an aspect, a computer monitor for use with a computer system having a root hub comprises: a power supply for supplying a power supply voltage; a universal serial bus hub controller having an upstream port connected to the root hub and a downstream port for selectively providing the power supply voltage in response to a power switching signal supplied through the upstream port; a monitor power switch for switching between supply and cut-off of an externally supplied power supply voltage to and from the power supply and for generating a switching state signal; a power level detector for detecting the power supply voltage supplied to the computer monitor and for generating a power state signal indicative of level of the power supply voltage; a logic circuit for receiving the switching state signal and the power state signal and for generating a switching control signal when at least one of them is supplied; a power switching section for selecting either the power supply voltage from the power supply or a host power supply voltage through the upstream port in response to the switching control signal; and a means for detecting an state of the power supply voltage provided through the downstream port to generate an overcurrent detection signal and for shutting off the supply of power of the overcurrent state to a universal serial bus device connected to the downstream port in response to the overcurrent detection signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
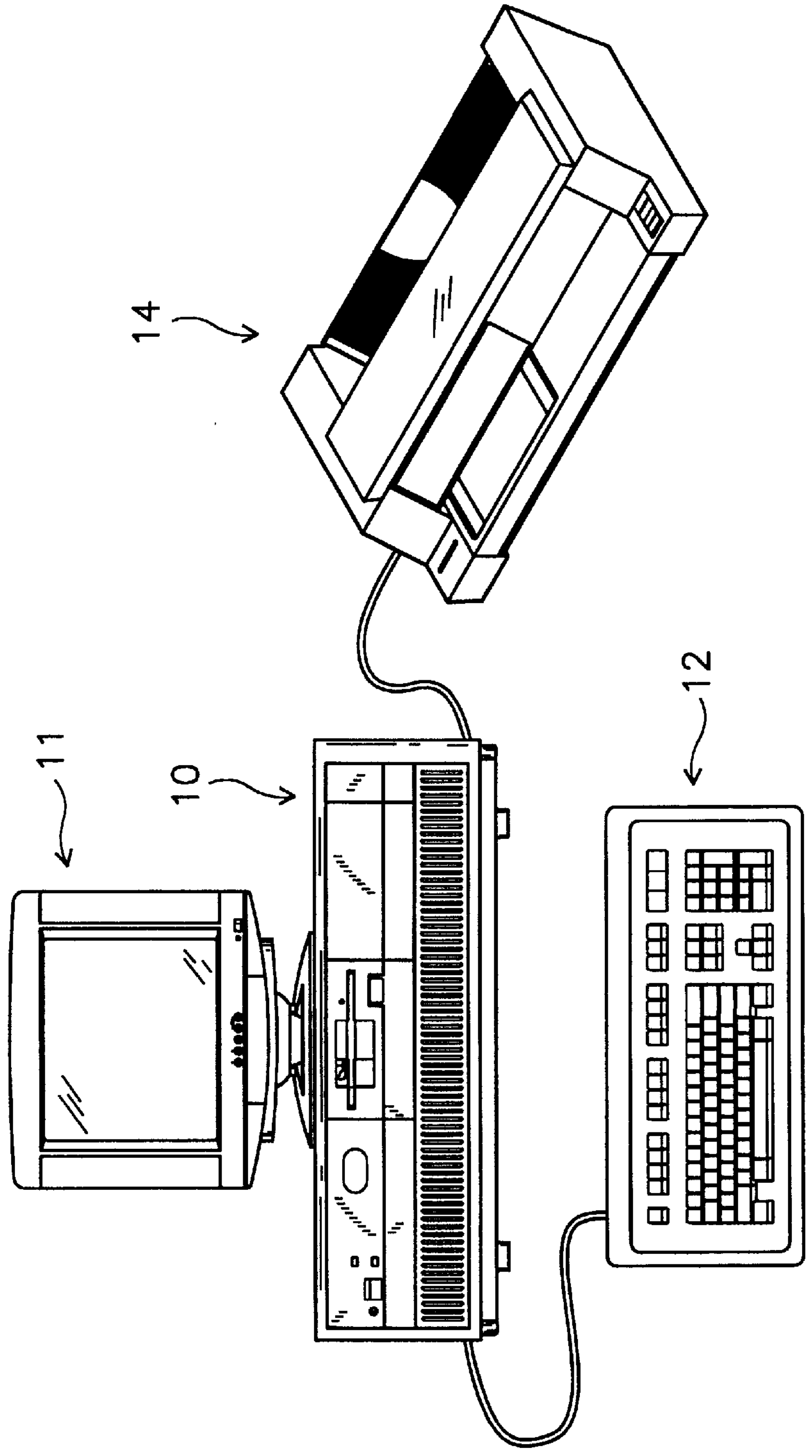
FIG. 1 is a schematic diagram showing the combination of a personal computer and peripheral devices thereof.
Figure 2:
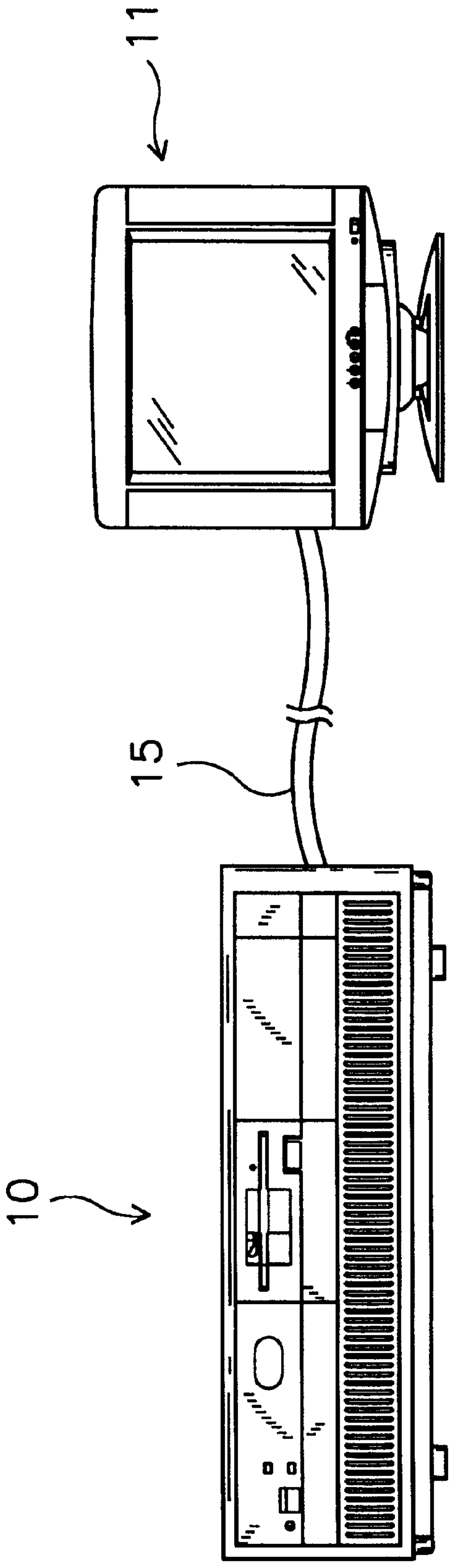
FIG. 2 is a schematic diagram showing the connection of the personal computer and a computer monitor over a video cable connected therebetween.

As shown in FIG. 1, personal computer 10 serving as a host may have an associated monitor 11 serving as a display apparatus, a keyboard 12 and a printer 14, a light pen or a plotter. The monitor 11 associated with the computer 10 is, as shown in FIG. 2, connected to a body of the computer 10 via a video cable 15, such as a D-Sub cable or a BNC video cable. The computer 10 provides video signals, e.g., R(red), G(green) and B(blue) video signals, vertical and horizontal synchronization signals, and the overall information required to control the monitor 11, to the monitor 11 through the video cable 15. Also, through the video cable 15, information indicative of the monitor-processed results from the monitor 11 are provided to the computer 10.

In addition to the keyboard 10 and the monitor 11, if other peripheral devices, such as a printer, a light pen, a plotter or the like, are connected to the computer 10 shown in FIG. 1, it is complicated to connect the computer 10 to the peripheral devices. Also, since the computer 10 is not provided with a plug and play function, it is difficult for a user to connect the peripheral devices to the computer 10.

Figure 3:
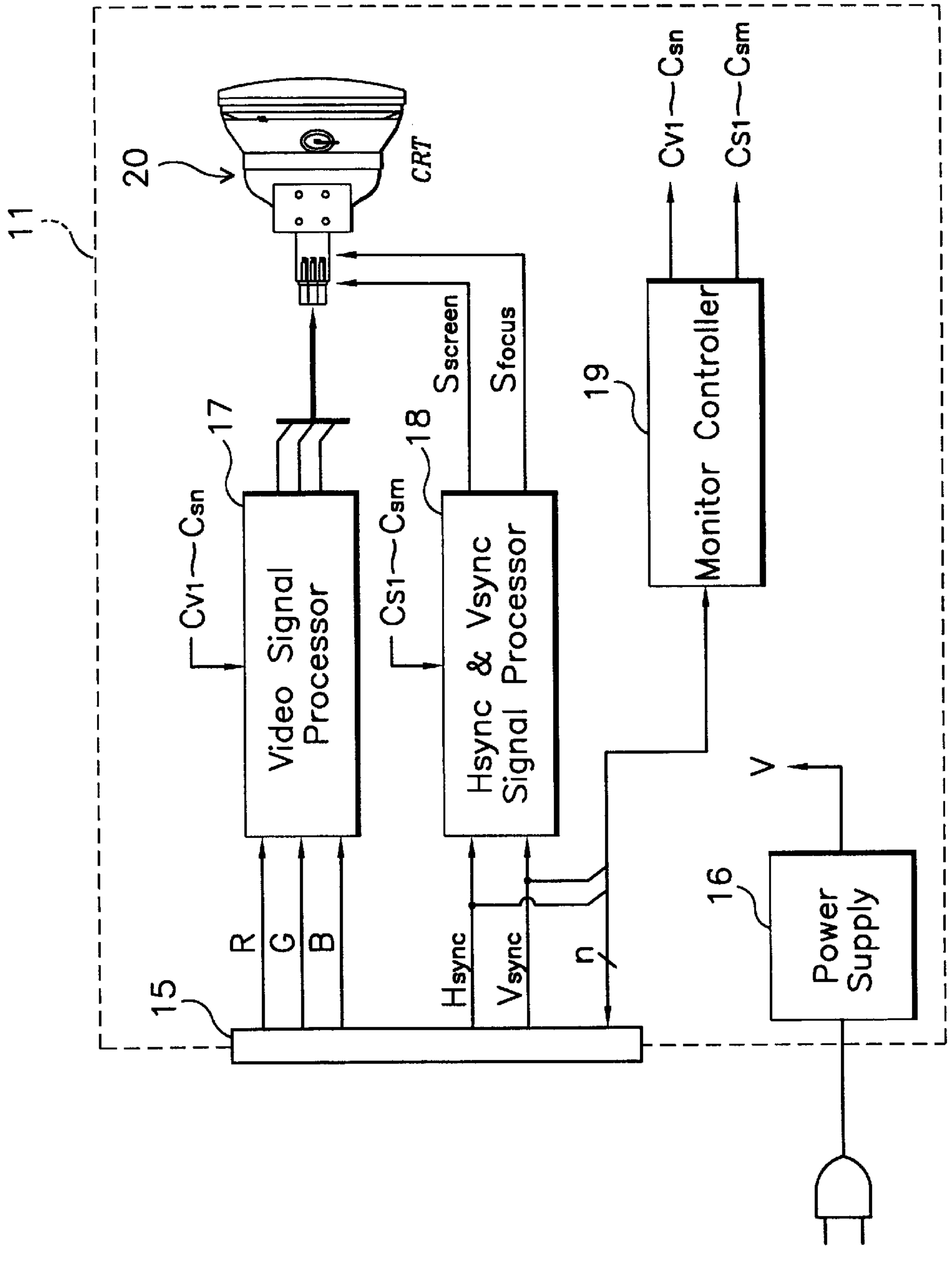
FIG. 3 is a block diagram showing a monitor circuit.
Figure 4:
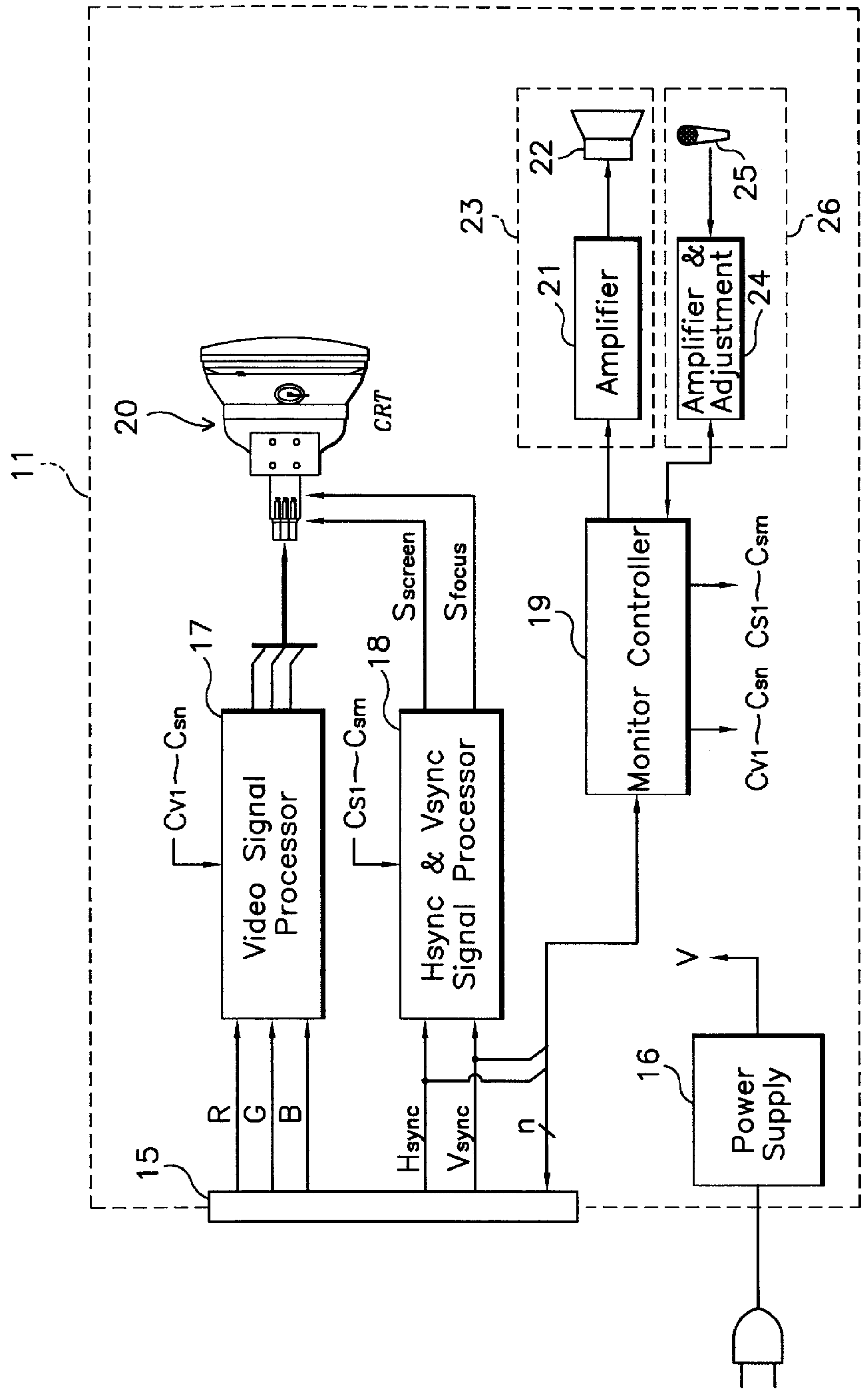
FIG. 4 is a block diagram another monitor circuit in which a speaker unit and a microphone unit are embodied.

So as to solve the above described problems, a universal serial bus (USB) system has been developed. FIGS. 3 and 4 show monitor circuits each of which has not been provided with the USB system.

The monitor of FIG. 3 has five main sections, a power supply 16, a video signal processor 17, a horizontal/vertical synchronization signal processor 18, a monitor controller 19 and a CRT (cathode ray tube) 20. The power supply 16 receives an AC (alternating current) voltage which is externally supplied through a plug, and provides several levels of DC (direct current) voltages to respective monitor circuit components. Also, the power supply 16 has a monitor power management system (DPMS) for reducing power consumption.

FIG. 4 shows the circuit construction of another computer monitor. This computer monitor has the same construction as that of FIG. 3 except that the monitor of FIG. 4 has an audio unit 23 for generating an audio signal and a voice input unit 26 for converting an audio signal into an electrical signal.

As shown in FIG. 4, the audio unit 23 has an amplifier 21 for amplifying an audio signal from the monitor controller 19 and a speaker 22 for converting the amplified audio signal into a voice signal. Also, the voice input unit 26 has a microphone 25 for converting a voice signal into an electrical signal, and an amplifier and adjustment section 24 for amplifying the electrical signal and adjusting input level of the microphone 25. As with the monitor of FIG. 2, each of the monitors shown in FIGS. 3 and 4 has the above described problems such as, difficulty of use for PC peripheral expansion and the like. Also, since the monitors do not have connectors for communicating with the peripheral devices, plug and play functions can not be performed.

In order to solve the above described problems, a computer monitor and method for supplying a power supply voltage has been designed by the same inventor as that of the present invention and is disclosed in Korean Patent Application No. 96-14792, filed May 7, 1997, as shown in FIGS. 5 through 9. In these figures, the same components as those in FIGS. 3 and 4 are indicated by the same reference numerals.

Figure 5:
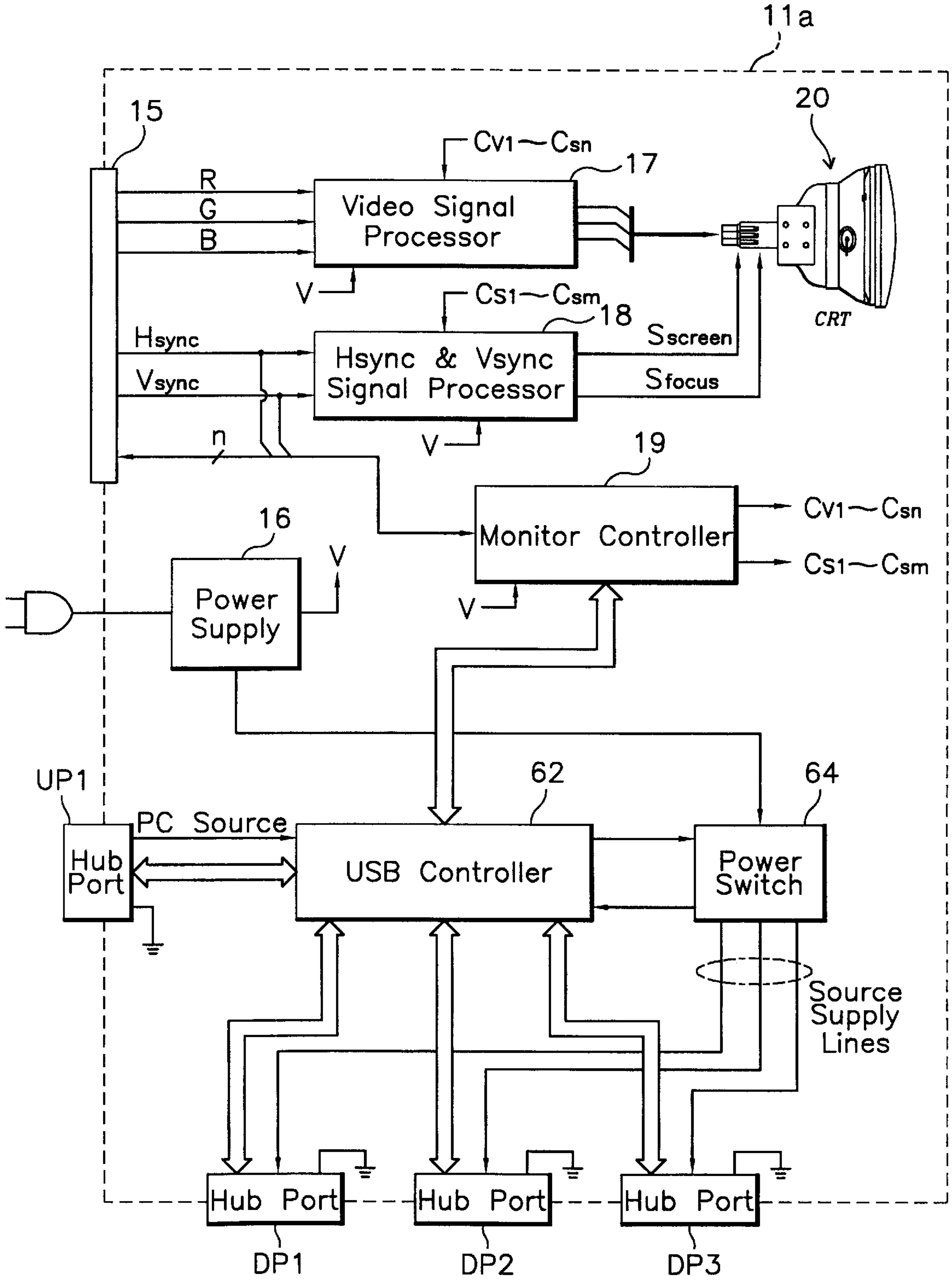
FIG. 5 is a circuit diagram showing an additional computer monitor.

As with the computer monitor of FIG. 3, the computer monitor 11*a* of FIG. 5 has a power supply 16, a video signal processor 17, a horizontal/vertical synchronization signal processor 18, a monitor controller 19 and a CRT (cathode ray tube) 20. In addition to the above described components, the computer monitor 11 a comprises a hub system used for expansion of computer peripherals. The hub system incorporated in the computer monitor 11*a* comprises, as shown in FIG. 5, three main sections, a USB controller 62, a power switch 64 and a plurality of input/output ports.

Figure 6:
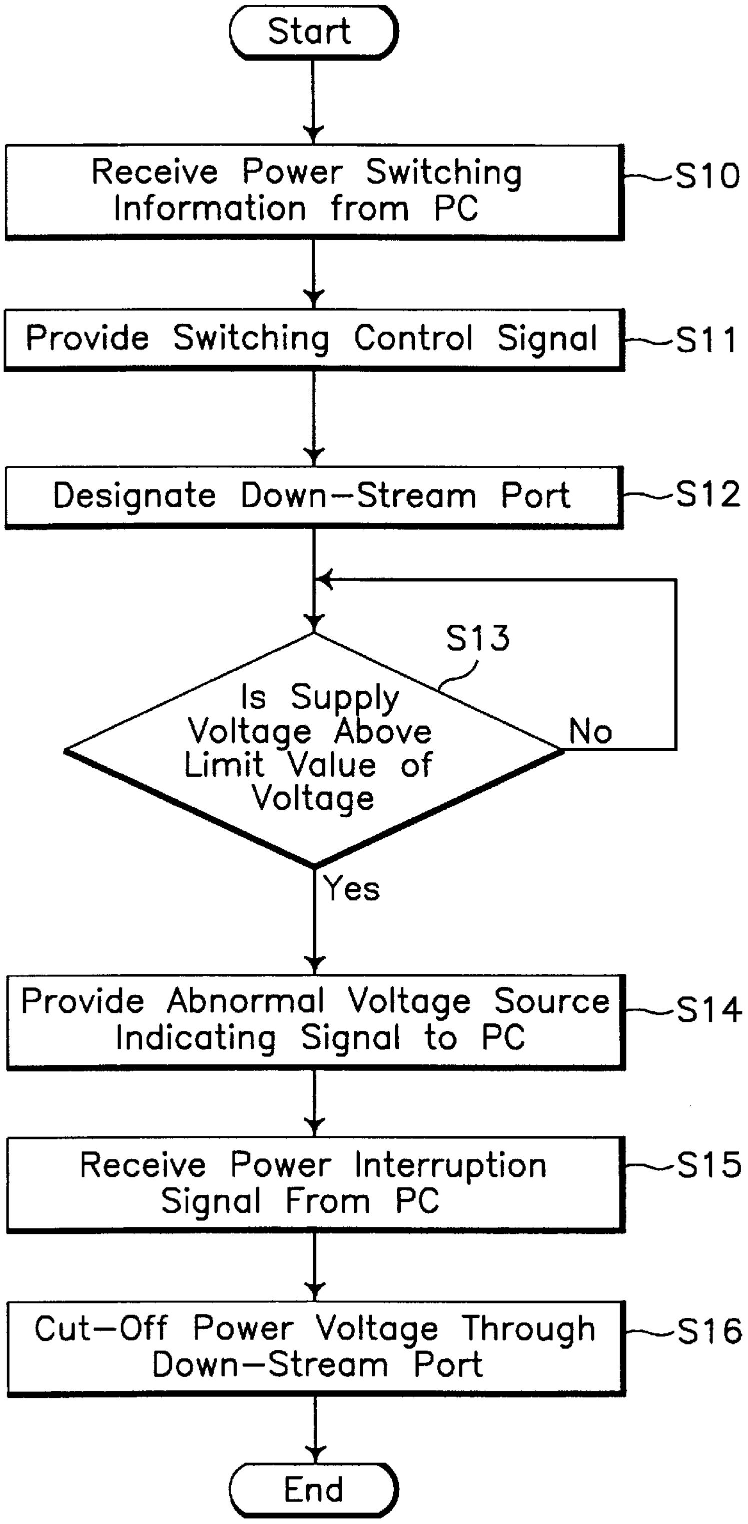
FIG. 6 is a flowchart showing a method of controlling the supply of power in the computer monitor shown in FIG. 5.

FIG. 6 is a flowchart showing a method of controlling the supply of power in the computer monitor 11*a* shown in FIG. 5. The controlling operation is performed in the USB controller 62. Referring to FIG. 6, at step S10, the USB controller 62 receives and analyzes a power control signal from the computer system 10. At this time, the control proceeds to step S11, wherein the controller 62 provides a power switching control signal to the power switch 64, which is composed of a multiplexer circuit and a micro-computer. At step S12, the power switch 64 designates corresponding ports of the downstream ports DP1–DP3 in response to the power switching control signal, so that power from the power supply 16 can be supplied through the designated ports. The control proceeds to step S13, wherein the USB controller 62 checks whether the voltage at the designated port is above the limit value of voltage. If so, the control proceeds to step S14, wherein the USB controller 62 provides an abnormal voltage indicating signal to the computer system 10, and the control proceeds to step S15. At step S15, the computer system 10 receives the abnormal voltage indicating signal and generates a cut-off control signal of power. At step S16, the cut-off control signal is provided to the computer monitor 11*a,* so that power supplied through the designated downstream ports of the monitor 11*a* is cut off.

In the above-described method, the monitor 11*a* can connect through the downstream ports thereof with the computer peripherals, and can control the selective supply of power to the computer peripherals.

Figure 7:
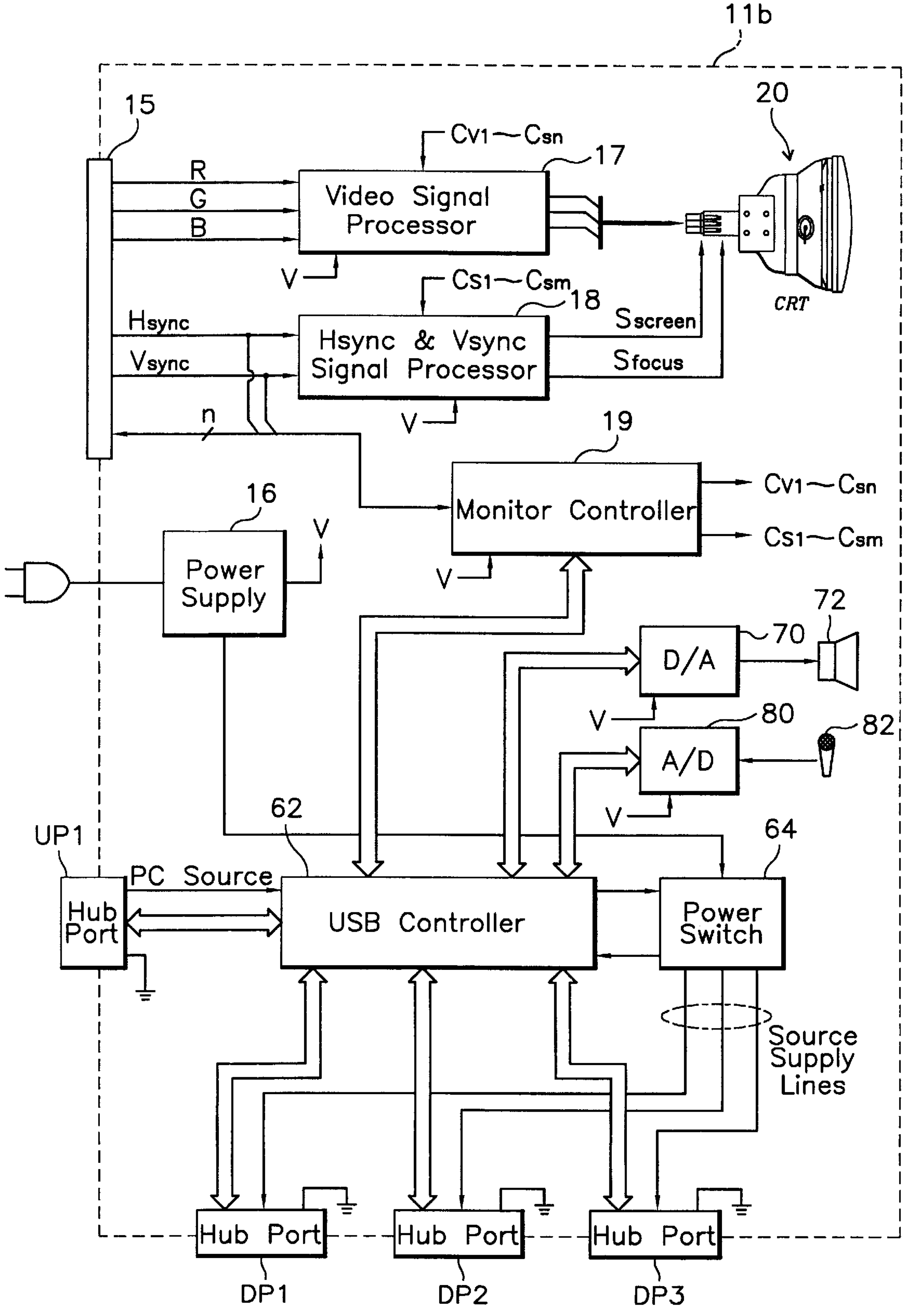
FIGS. 7 through 9 are circuit diagrams showing other computer monitors.
Figure 8:
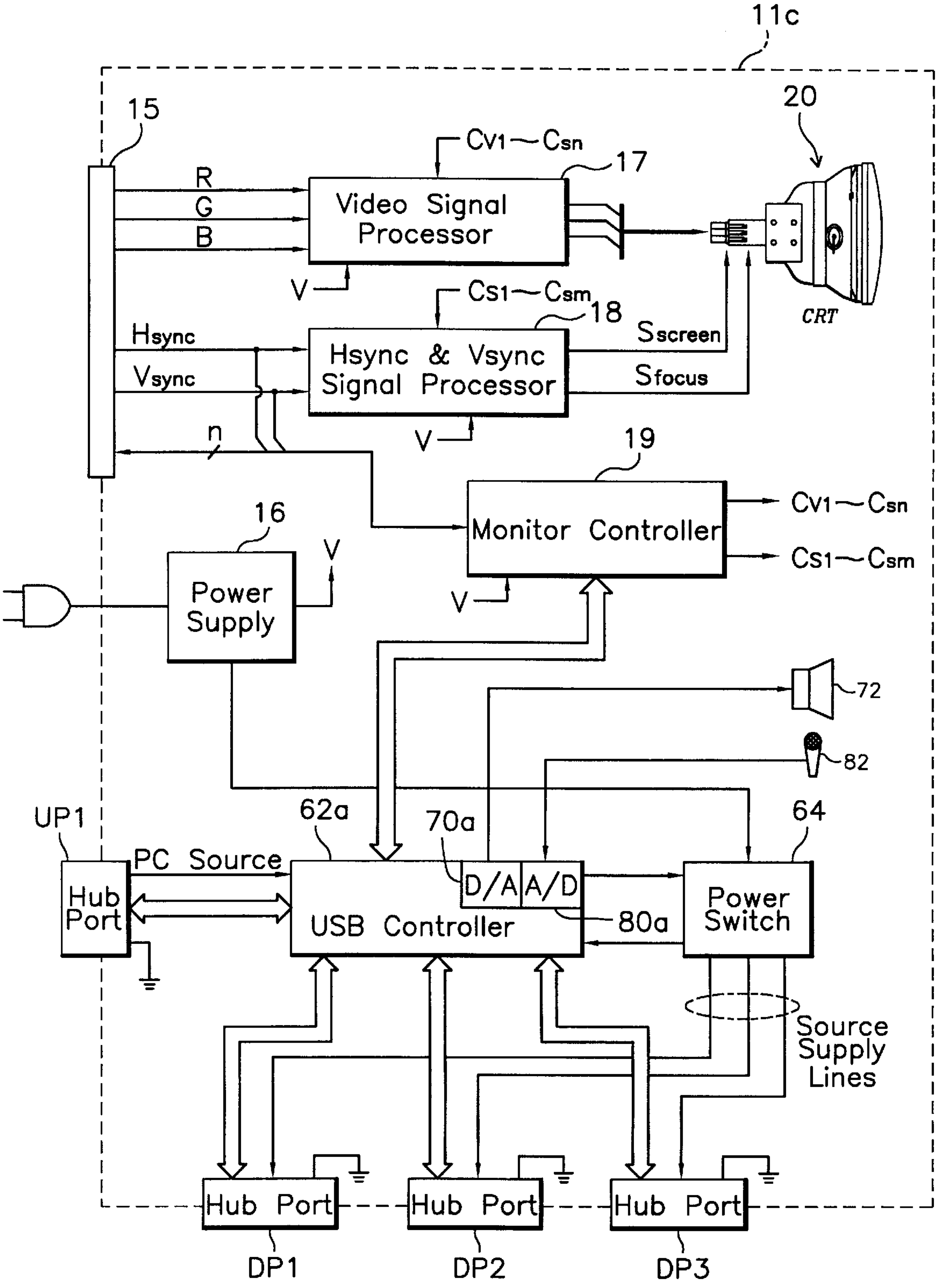
Figure 9:
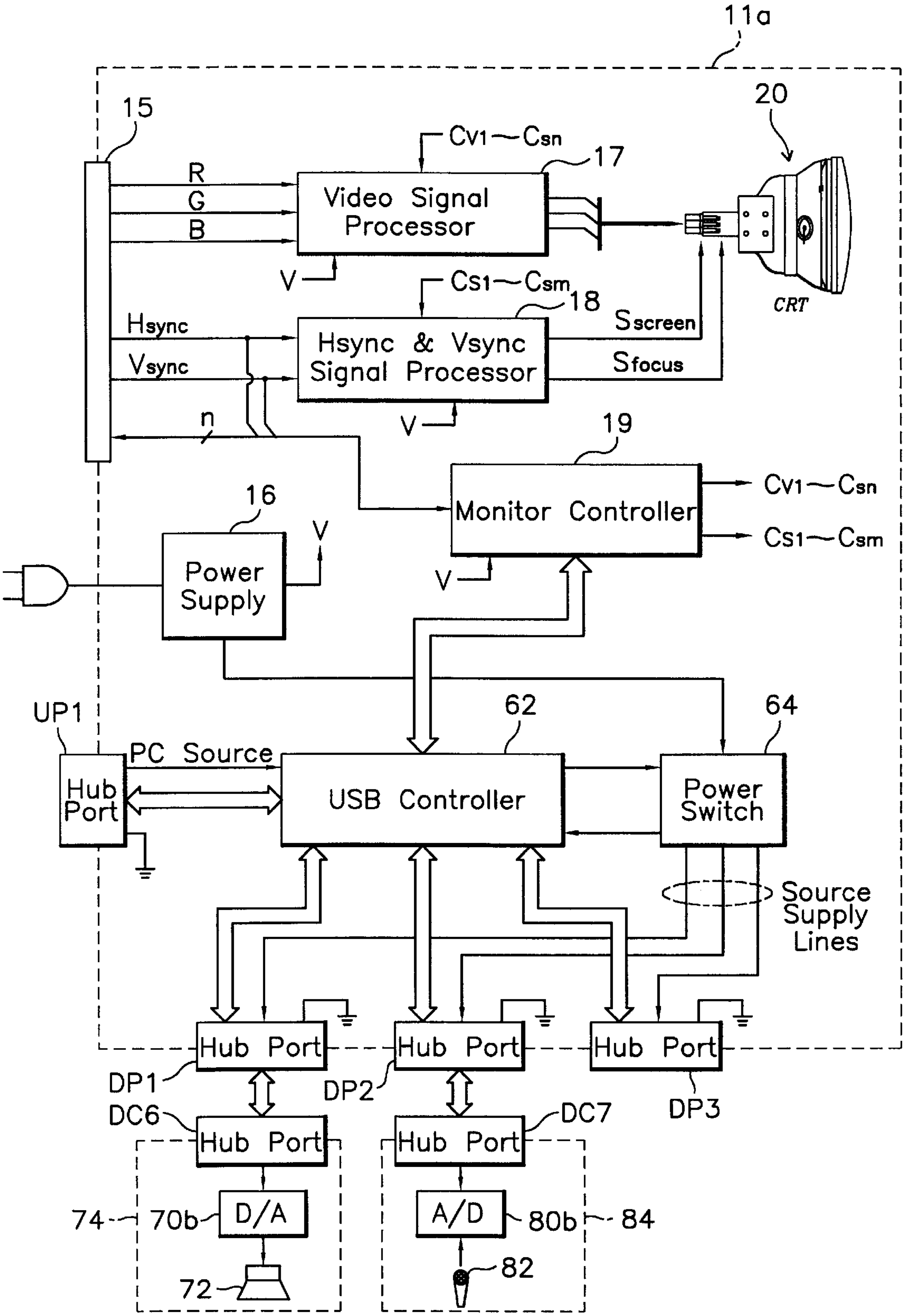

FIGS. 7 through 9 are circuit diagrams showing other computer monitors.

As with the monitor of FIG. 5, a computer monitor 11*b* of FIG. 7 has a hub system used for expansion of computer peripherals, a power supply 16, a video signal processor 17, a horizontal/vertical synchronization signal processor 18, a monitor controller 19 and a CRT 20. The monitor 11*b* further has an audio decoder 70 which is connected between the USB controller 62 and a speaker 72, and an audio encoder 80 which is connected between the USB controller and a microphone 82. The audio decoder 70, constituted by a digital-to-analog converter, and the audio encoder 80, constituted by an analog-to-digital converter, are installed outside the USB controller 62. In FIG. 7, the USB controller 62 receives a digital audio signal from an audio system (not shown), which is connected to one of the downstream ports DP1 to DP3, and provides the audio signal to the audio decoder 70. Alternatively, the USB controller 62 receives a digital audio signal via the upstream port UP1 from the computer system 10 and provides the audio signal to the audio decoder 70. The audio decoder 70 converts the digital audio signal into an analog audio signal to be provided to the speaker 72. Also, the USB controller 62 receives an electrical voice signal, which is generated by the microphone 82, through the audio encoder 80, and provides the voice signal through the corresponding downstream port to the audio system or provides the voice signal through the upstream port UP1 to the computer system 10. A voice is converted into an electrical analog signal by means of the microphone 82 and this analog signal is converted into an digital signal by means of the audio encoder 80.

A computer monitor 11*c* of FIG. 8 has the same construction as the monitor 116 of FIG. 7 except that an audio decoder 70*a* and an audio encoder 80*a* are embodied within a USB controller 62*a*. A computer monitor 11*a* of FIG. 9 has the same construction as that of FIG. 5 except that the computer monitor 11*a* of FIG. 9 has a speaker unit 74 connected through the hub downstream port DP1 and a microphone unit 84 connected through the hub downstream port DP2. The speaker unit 74 has a USB device connector DC6, which is connected to the hub downstream port DP1, an audio decoder 70*b* and a speaker 72. The microphone unit 84 has a USB device connector DC7, which is connected to the hub downstream port DP2, an audio encoder 80*b* and a microphone 82. The audio decoder 70*b,* constituted by a digital-to-analog converter, and the audio encoder 80*b* constituted by an analog-to-digital converter, are respectively connected to the hub downstream ports DP1 and DP2.

In the above-described computer monitors, when a power supply voltage is cut off from the power supply 16, for example, during power-off of the respective monitor or during a power saving mode, a power supply voltage provided from the power supply 16 or the hub port UP1 connected to the host is not supplied to the USB devices, which are respectively connected through the hub ports DP1, DP2 and DP3 connected to the USB controller. Thus, the USB devices are not operated Referring to FIG. 14, a novel computer monitor for use with a host computer (ie., a computer system) in accordance with the present invention has a hub system which is capable of communicating with computer peripherals (, e.g. USB devices) and selecting a first power supply voltage supplied from a power supply 16 incorporated therewith and a second power supply voltage supplied through a hub port UP1 connected to the host computer in accordance with a power supply/cut-off state of the power supply 16. Thus, even though supply of the first power supply voltage to the computer monitor is cut off, the hub devices connected with the computer monitor can be normally operated with the second power supply voltage from the host computer. Herein, the power supply/cut-off state means that an externally supplied power supply voltage is supplied to the power supply 16, or not, by means of a monitor power switch 91, or that the power supply 16 in at a power saving mode.

The USB is a cable bus that supports data exchange between a host computer and a wide range of simultaneously accessible peripherals. A USB system may be defined by three definitional areas: USB interconnect, USB devices, and USB host. The USB interconnect is the definitional area in which the USB devices are connected to and communicate with the host computer. The USB devices are hubs which provide additional attachment points to the USB devices, and have functions which provide capabilities to the system; for example, an ISDN connection, a digital joystick, or speakers.

Figure 10:
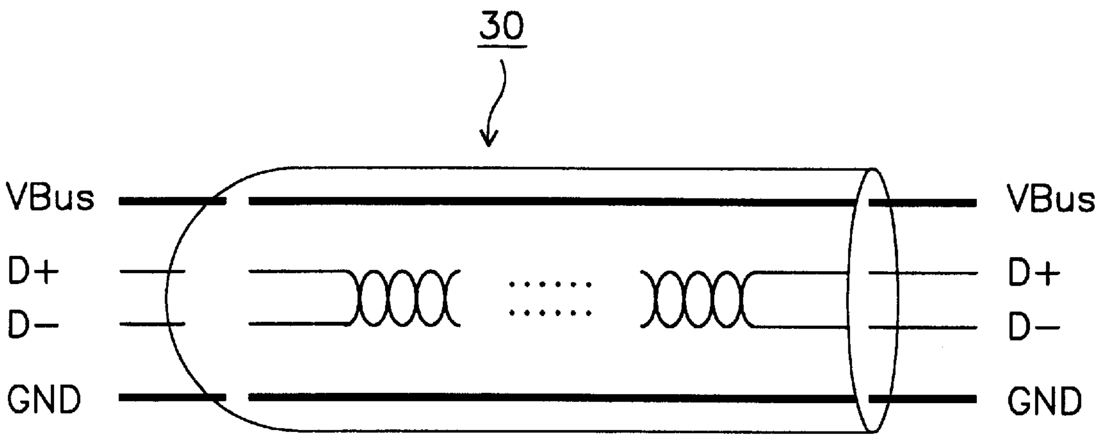
FIG. 10 is a schematic diagram showing a USB cable which is provided to incorporate with a novel computer monitor according to the present invention.

The USB transfers signal and power over a four wire cable 30, shown in FIG. 10. There are two modes of signaling, one of which is a USB full speed signaling bit rate of 12 Mbs, and the other is a limited capability low speed signaling mode of 1.5 Mbs. The USB cable 30 of FIG. 10 has four wires. Of the four wires, two wires VBus and GND are provided to deliver power to the USB devices. The other wires D+ and D− are provided to transfer the USB transfer signal. The Vbus is nominally +5 V at the source.

Figure 11:
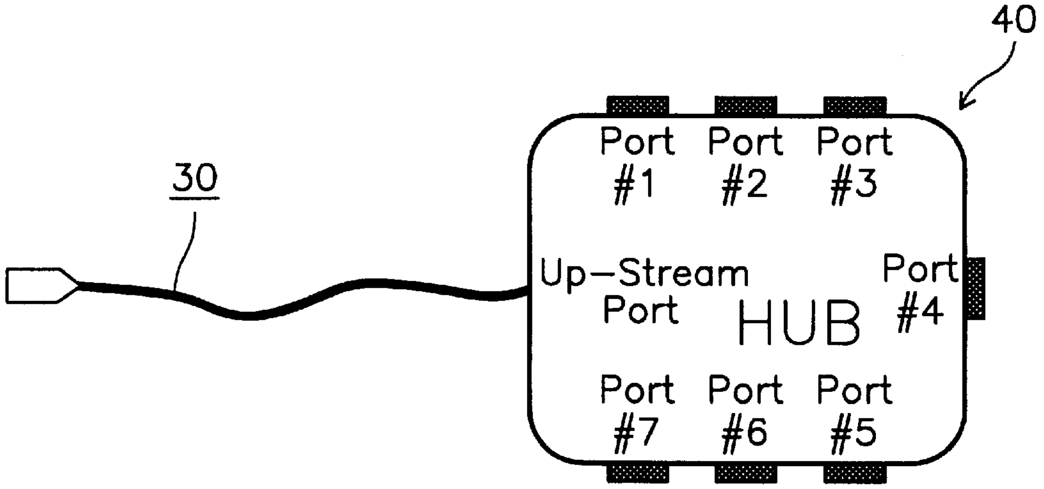
FIG. 11 is a schematic diagram showing a USB hub which is provided to incorporate with the novel computer monitor shown in FIG. 10.
Figure 12:
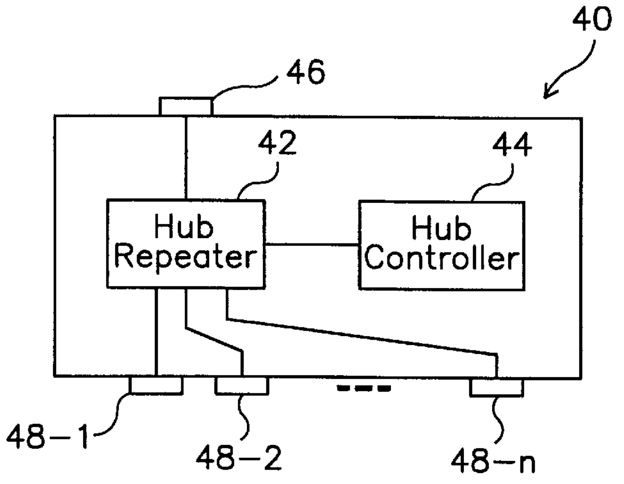
FIG. 12 is a detailed block diagram showing the circuit construction of the USB hub shown in FIG. 11.

A USB hub 40 repeats, as shown in FIG. 11, upstream data provided through the upstream port thereof to a plurality of downstream ports Port# 1 to Port#7, and controls the communication speed (i.e., 12 Mbs or 1.5 Mbs) and supply of power to the downstream ports by means of the control of a controller thereof. Also, the USB hub 40 has, as shown in FIG. 12, two main sections, a hub controller 44 and a hub repeater 42. The hub repeater 42 is a protocol switch between the upstream port 46 and the downstream ports 48-1, 48-2, . . . , 48-n. The hub controller 44 has interface register to allow communication to/from the host computer.

Figure 13:
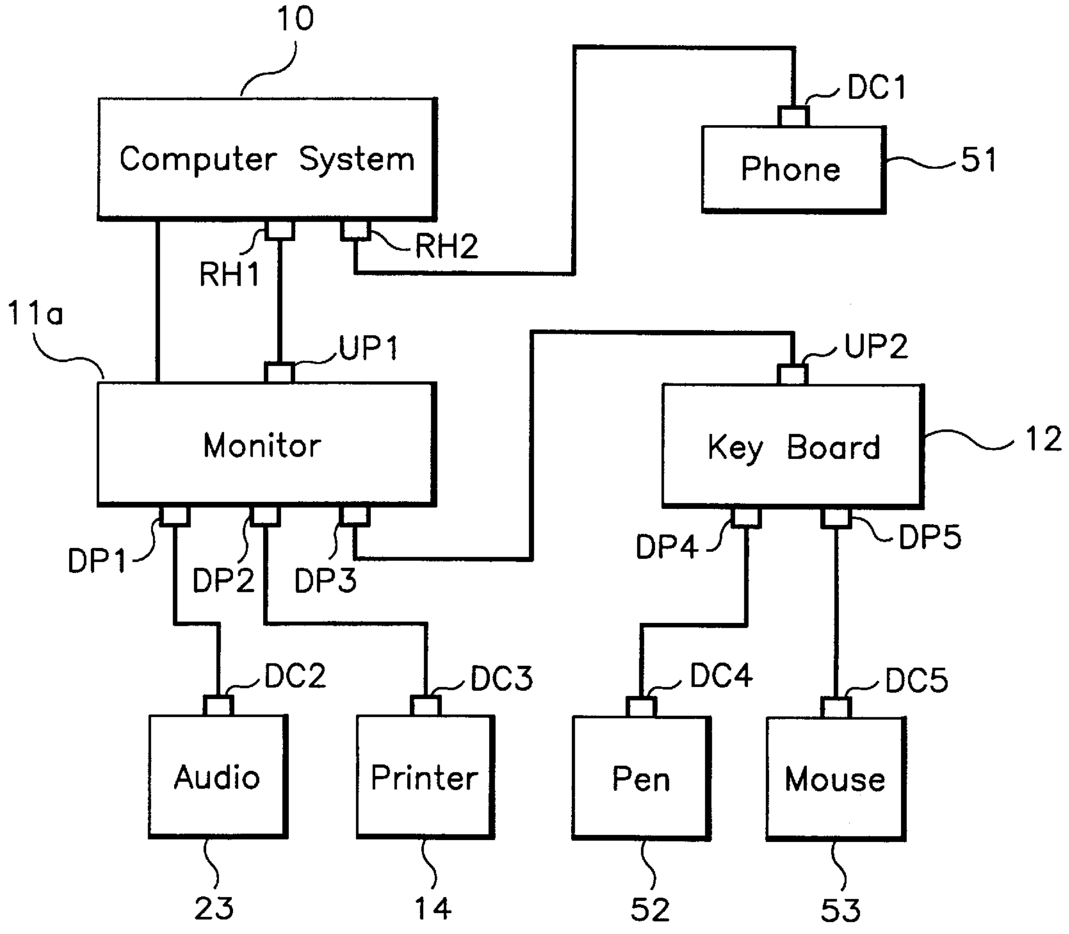
FIG. 13 is a schematic diagram showing the connection of the novel computer monitor to a computer system through the USB hub.

FIG. 13 shows the connection of the novel computer monitor to a computer system through the USB hub 40. In FIG. 13, the computer system 10 has, for example, two root hubs RH1 and RH2. The root hub RH2 is connected through a USB cable to the USB device connector DC1 with which a telephone 51 is provided, and it thereby serves as a communication hub. The root hub RH1 is connected through another USB cable to the upstream port UP1 of the hub with which a computer monitor 11*a* is provided. Since the hub of the computer monitor 11*a* is composed of a self-powered device, it can supply power to USB devices connected therewith.

Namely, as shown in FIG. 13, downstream ports DP1 and DP2 of the hub of the monitor 11*a* are connected through USB device connectors DC2 and DC3 to an audio unit 23 and a printer 14, and a down stream port DP3 is connected through an upstream port UP2 of the hub with which a keyboard 12 is provided. The hub of the keyboard 12 is composed of a bus-powered device, and supplies power through a USB cable to USB devices, e.g., a light pen 52 and a mouse 53, as shown in FIG. 13. Thus, downstream ports DP4 and DP5 of the keyboard 12 are respectively connected to USB device connectors DC4 and DC5 of the light pen 52 and mouse 53.

As described immediately above, the computer monitor 11*a* of the present invention has a hub which allows self-supplied power to be provided to USB devices connected therewith, and therefore the computer peripherals can be connected directly to the computer monitor 11*a*. Accordingly, the computer monitor 11*a* allows a plug and play function to be performed.

Figure 14:
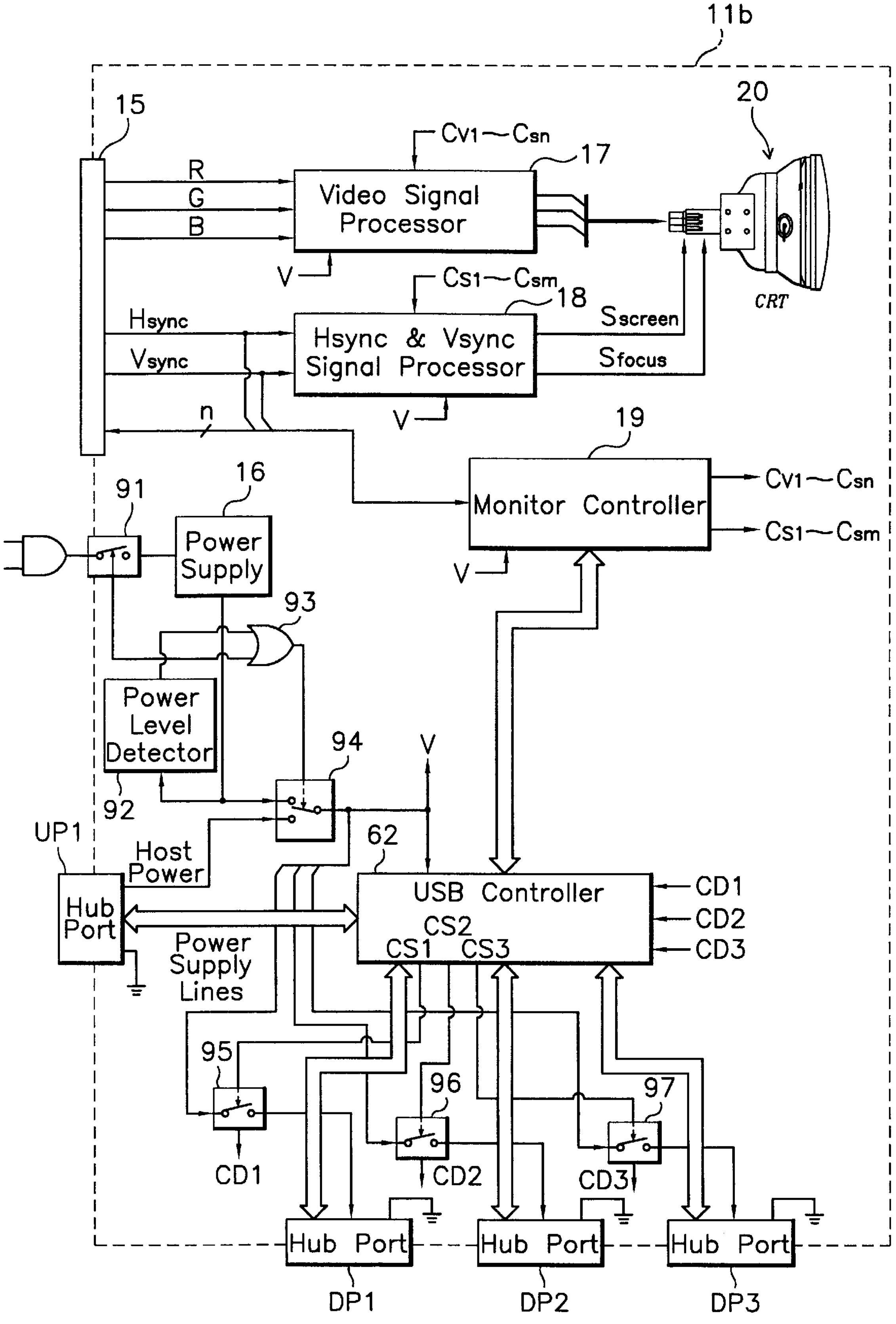
FIG. 14 is a circuit diagram showing a novel computer monitor according to a first embodiment of the present invention.

FIG. 14 is a circuit diagram showing a novel computer monitor according to a first embodiment of the present invention, and the same components as those in FIG. 5 are indicated by the same reference numerals.

Referring to FIG. 14, the novel computer monitor 11*a* comprises a hub system used for expansion of computer peripherals. In addition to the hub system, the computer monitor 11*a* comprises a power supply 16, a video signal processor 17, a horizontal/vertical synchronization signal processor 18, a monitor controller 19 and a CRT (cathode ray tube) 20. The power supply 16 receives an AC (alternating current) voltage which is externally supplied through a plug, and provides several levels of DC (direct current) voltages to respective monitor circuit components. Also, the power supply 16 has a monitor power management system (DPMS) for reducing power consumption.

Referring again to FIG. 14, the monitor controller 19 receives monitor driving information through the video cable 15 connected to the computer 10 and generates two groups of control signals, i.e., a first group of control signals Cv1–Cvn necessary for processing the R, G and B video signals and a second group of control signals Cs1-Csm used to control screen and focus, in response to the monitor driving information. The first group of control signals Cv1-Cvn comprise a screen adjusting signal, R(red) G(green) B(blue) driving signals and RGB cut-off adjusting signals. The video signal processor 17 is provided to process the video signals from the computer 10 via the video cable 15 in response to the first group of control signals Cv1-Cvn. The processed video signals are supplied to electron guns of the CRT 20 so that the electron guns can radiate beams corresponding the red, green and blue video signals.

The horizontal/vertical synchronization signal processor 18 is provided to process horizontal and vertical synchronization signals (hereinafter, referred to as "Hsync and Vsync") which are supplied from the computer 10 via the video cable 15 and deflect the beams from the electron guns in a direction, so that screen and focus can be controlled. Namely, the Hsync/Vsync processor 18 can control, in response to the processed Hsync and Vsync signals, horizontal position and size of image displayed on screen, vertical position and size of the image, side pincushion, tilt, pin valance, top and bottom corner corrections, and the like.

The hub system incorporated in the computer monitor 11*a* comprises, as shown in FIG. 14, three main sections, a USB controller 62 and a plurality of input/output ports. The USB controller 62 is connected through IC or UART to the monitor controller 19 so as to communicate to/from the monitor controller 19, and provided to perform a programmed control operation in response to information from the computer system 10. Of the input/output ports, the input port indicates an upstream port UP1 which receives the distributed power and information supplied through the root hub RH1 of the computer system 10, and the output ports indicate downstream ports DP1 to DP3 which are connected to the USB devices, ie., the keyboard 12, the audio unit 23 and the printer 14, to transmit the power and information thereto.

The computer monitor of the present invention further comprises, as shown in FIG. 14, a monitor power switch 91, a power level detector 92, a logic circuit 93, a power switching section 94 and overcurrent detection/current-limit circuits 95–97. The monitor power switch 91 is provided to switch between supply and cut-off of an externally supplied power supply voltage to and from the power supply 16 and to generate a switching state signal. The power supply level detector 92 is provided to detect the power supply voltage from the power supply 16 which is supplied to the computer monitor and generates a power state signal indicative of level of the power supply voltage The logic circuit 93 is provided to receive the power supply state signal from the power supply level detector 92 and the switching state signal and to generate a switching control signal when at least one of them is supplied. The power switching section 94 is provided to select either the power supply voltage from the power supply 16 or a host power supply voltage supplied through the upstream port UP1 in response to the switching control signal. The overcurrent detection/current-limit circuits 95–97 are established corresponding to downstream ports DP1–DP3, as shown in FIG. 14. Each of the circuits 95–97 detects an overcurrent state of the power supply voltage which is supplied to each downstream port to generate an overcurrent detection signal.

Overcurrent detection signals CD1–CD3 from the overcurrent detection/current-limit circuits 95–97 are supplied to the USB controller 62. Then, the USB controller 62 generates switch control signals CS1–CS3 in response to the overcurrent detection signals CD1–CD3 and thus the circuits 95—95 are switched in response to the switch control signals CS1–CS3 to be at a cut-off state. For example, if an overcurrent signal flows through the corresponding downstream port, the overcurrent detection/current-limit circuit connected to the downstream port generates an overcurrent detection signal to provide the detected signal to the USB controller 62. Then, the corresponding overcurrent detection/current-limit circuit is controlled to be at the cut-of state by means of the USB controller 62 so that the power supply voltage supplied through the power switching section 94 is not supplied to the corresponding downstream port. As a result, a USB device connected to the corresponding downstream port does not become damaged.

On the other hand, the power supply 16 has an effective power saving function and is controlled in accordance with a DPMS of VESA (video electronic standard association). Also, the power supply 16 operates in accordance with power saving operations having a stand-by mode, a suspend mode and a power offmode. If the computer monitor 11*a* is powered off, a power indicator (not shown) which is located on the front (not shown) of the monitor 11*a* is turned on and off about every 0.5 second during the stand-by mode or the suspend mode, and about every 1 second during the power off mode. During the power saving operations, if an key entry occurs from an input device such as a keyboard or a mouse, the previous image can automatically be recovered on the screen.

Also, during normal operation, the power supply 16 supplies several levels of power supply voltages such as, +80 V, +150 V, +24 V, +12 V, +5 V and the like, to components of the monitor 11*a*. Particularly, the +5 V power is used as power of the respective USB downstream ports in the hub system and switched by the control signal from the USB controller 62.

As with the USB cable of FIG. 10, the upstream port UP1 of FIG. 13 has four terminals, i.e., Vdd, data+, data− and ground. The USB controller 62 receives data which is provided from the computer system 10, through the upstream port UP1, and repeats the data to the downstream ports DP1–DP3. Also, the USB controller 62 analyzes a monitor control signal from the computer system 10 and transmits the analyzed information to the monitor controller 19 by means of the communication protocol of $I^2C$ or UART.

In this example, the monitor 11*a* can connect through the downstream ports thereof with the computer peripherals, and can control the selective supply of power to the computer peripherals.

Also, the monitor 11*a* can detect when overcurrent flows to the computer peripherals and cut off the supply of power to them.

Figure 15:
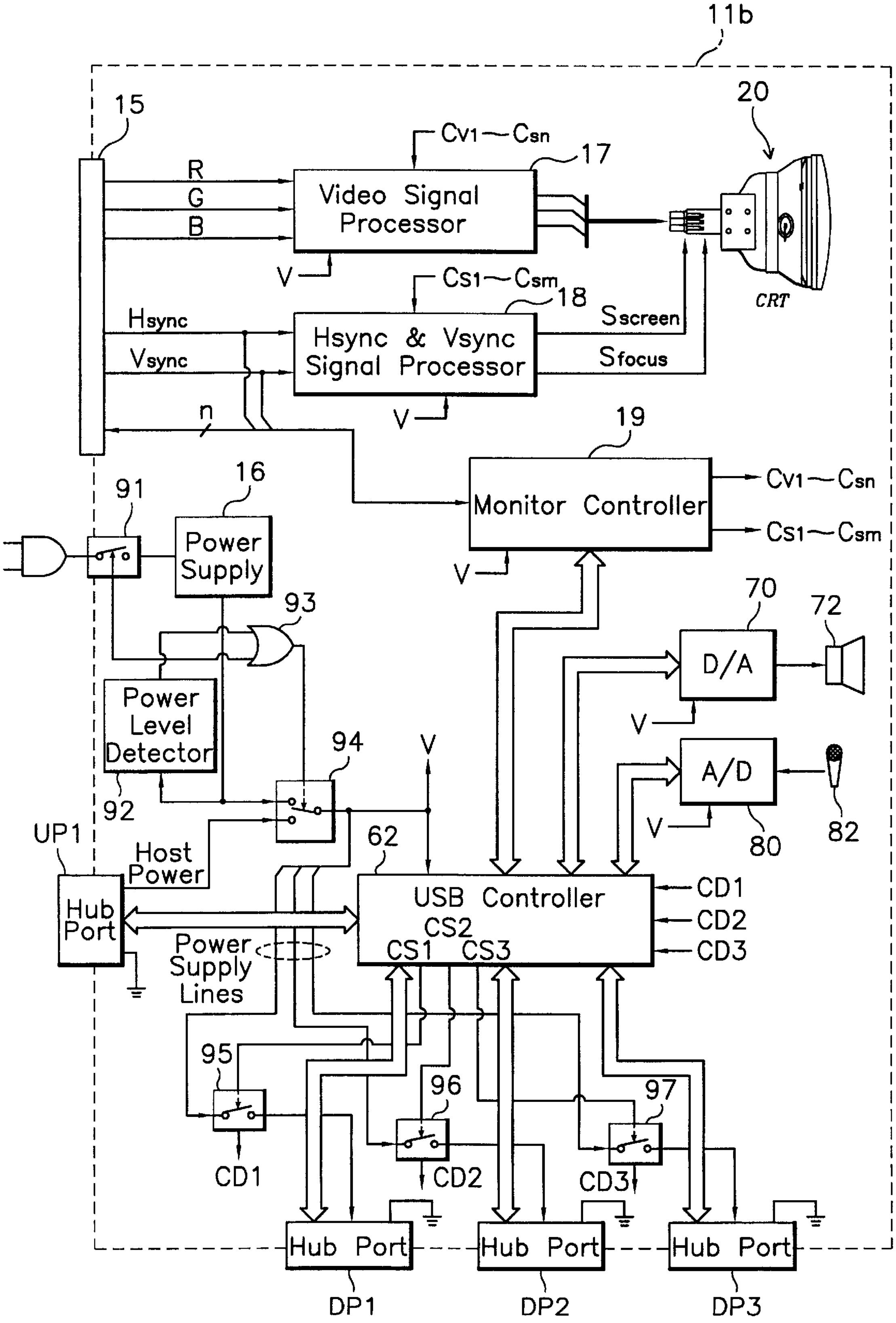
FIG. 15 is a circuit diagram showing a computer monitor according to a second embodiment of the present invention.

FIG. 15 is a circuit diagram showing a novel computer monitor according to a second embodiment of the present invention, and the same components as those in FIG. 14 are indicated by the same reference numerals.

Referring to FIG. 15, in addition to the components of the monitor 11*a* shown in FIG. 14, the novel computer monitor 11*b* further comprises an audio decoder 70 which is connected between the USB controller 62 and a speaker 72, and an audio encoder 80 which is connected between the USB controller 62 and a microphone 82. The audio decoder 70, constituted by a digital-to-analog converter, and the audio encoder 80 constituted by an analog-to-digital converter, are installed outside the USB controller 62, as shown in FIG. 15.

In the example, the USB controller 62 receives a digital audio signal from an audio system (not shown), which is connected to one of the downstream ports DP1 to DP3, and provides the audio signal to the audio decoder 70. Alternatively, the USB controller 62 receives a digital audio signal via the upstream port UP1 from the computer system 10 and provides the audio signal to the audio decoder 70. The audio decoder 70 converts the digital audio signal into an analog audio signal to be provided to the speaker 72.

Also, the USB controller 62 receives an electrical voice signal, which is generated by the microphone 82, through the audio encoder 80, and provide the voice signal through the corresponding downstream port to the audio system or the voice signal through the upstream port UP1 to the computer system 10. The voice is converted into an electrical analog signal by means of the microphone 82 and this analog signal is converted into a digital signal by means of the audio encoder 80.

In this example, the computer monitor 11*b* allows a power supply voltage to be supplied to several USB devices connected therewith and can cut off supply of the power supply voltage to the USB devices when an abnormal voltage of more than a rated voltage is supplied through the downstream ports to the USB devices.

Furthermore, the computer monitor 11*b* allows the USB devices connected therewith to be operated with a host power supply voltage provided through the upstream port, even though the power supply voltage from the power supply 16 has been cut off.

Figure 16:
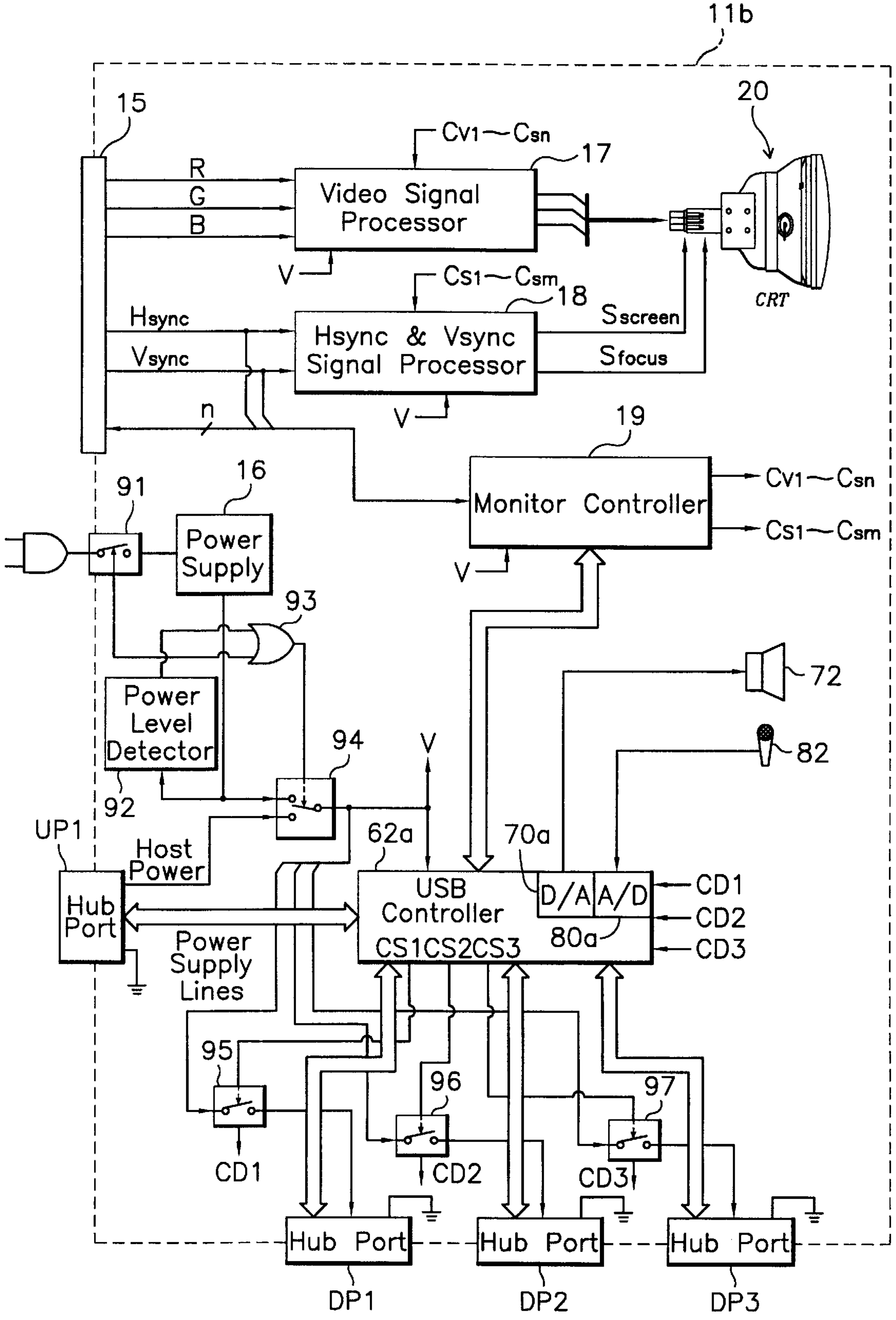
FIG. 16 is a circuit diagram showing a computer monitor according to a third embodiment of the present invention.

FIG. 16 is a circuit diagram showing a novel computer monitor according to a third embodiment of the present invention, and the same components as those in FIG. 15 are indicated by the same reference numerals to omit the description thereof. The novel computer monitor 11*c* of FIG. 16 has the same construction as that of FIG. 11 except that an audio decoder 70*a* and an audio encoder 80*a* are embodied within a USB controller 62*a*.

Referring to FIG. 16, the audio decoder 70*a,* constituted by a digital-to-analog converter, and the audio encoder 80*a*, constituted by an analog-to-digital converter, are embodied in the USB controller 62. In the monitor 11*c,* the USB controller 62*a* receives a digital audio signal from an audio system (not shown), which is connected to one of the downstream ports DP1 to DP3, and provides the audio signal to the audio decoder 70*a.* Alternatively, the USB controller 62*a* receives a digital audio signal via the upstream port UP1 from the computer system 10 and provides the audio signal to the audio decoder 70*a.* The audio decoder 70*a* converts the digital audio signal into an analog audio signal to be provided to the speaker 72.

Also, the USB controller 62*a* receives an electrical voice signal, which is generated by the microphone 82, through the audio encoder 80*a,* and provide the voice signal through the corresponding downstream port to the audio system or the voice signal through the upstream port UP1 to the computer system 10. The voice is converted into an electrical analog signal by means of the microphone 82 and this analog signal is converted into an digital signal by means of the audio encoder 80*a*.

The computer monitor 11*c* of FIG. 16 has the same effects as those of the computer monitor 11*b* of FIG. 15.

Figure 17:
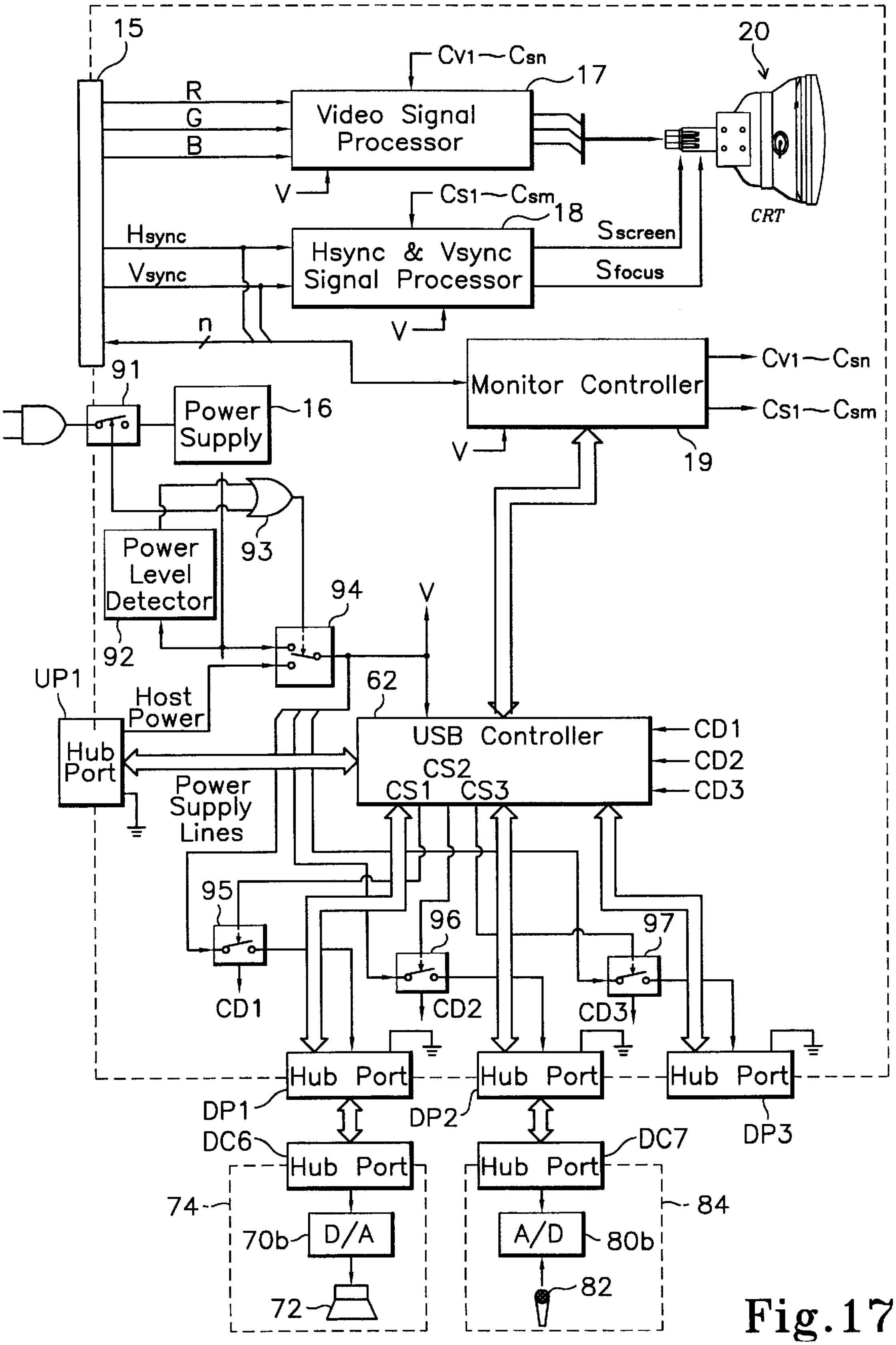
FIG. 17 is a circuit diagram showing a computer monitor according to a fourth embodiment of the present invention.

FIG. 17 is a circuit diagram showing a novel computer monitor according to a fourth embodiment of the present invention, and the novel computer monitor 11*a* of FIG. 17 has the same construction as that of FIG. 14 except that a speaker unit 74 is connected via a downstream port DP1 to the USB controller 62 and a microphone unit 84 is connected via a downstream port DP2 thereto Referring to FIG. 17, the speaker unit 74 has a USB device connector DC6, which is connected to the hub downstream port DP1, an audio decoder 70*b* and a speaker 72. The microphone unit 84 has a USB device connector DC7, which is connected to the hub downstream port DP2, an audio encoder 80*b* and a microphone 82. The audio decoder 70*b,* constituted by a digital-to-analog converter, and the audio encoder 80*b,* constituted by an analog-to-digital converter, are respectively connected to the hub downstream ports DP1 and DP2.

The computer monitor 11*a* of FIG. 17 has the same effects as those of the computer monitor 11*b* of FIG. 15.

As described above, a computer monitor according to the present invention can be operated by a host power supply voltage provided through host-connected hub ports, even though a power supply voltage from a power supply of the monitor has been cut off.

Also, the computer monitor detects when a power supply voltage to USB devices connected thereto is beyond a rated voltage, and shuts off an abnormal voltage of more than the rated voltage which is supplied to a the USB devices, so that it can prevent the USB devices from being damaged due to the abnormal voltage.

What is claimed is:

1. A computer monitor for a computer system having a root hub, comprising:

a power supply for supplying a power supply voltage;

a universal serial bus (USB) hub controller having an upstream port connected to the root hub and at least one downstream port for selectively providing the power supply voltage in response to a power switching signal applied through the upstream port;

a monitor power switch for switching between supply and cut-off of an externally supplied power supply voltage to and from the power supply and for generating a switching state signal;

a power supply level detector for detecting the power supply voltage from the power supply supplied to the computer monitor to generate a power state signal indicative of level of the power supply voltage;

a logic circuit for receiving the switching state signal and the power state signal and for generating a switching control signal when at least one of them is supplied;

a power switching section for selecting either the power supply voltage from the power supply or a host power supply voltage through the upstream port in response to the switching control signal; and a means for detecting an overcurrent state of the power supply voltage provided through the downstream port to generate an overcurrent detection signal and for shutting off the supply of power of the overcurrent state to a universal serial bus device connected to the downstream port in response to the overcurrent detection signal.

2. The computer monitor according to claim 1, said logic circuit comprising an OR gate.

3. The computer monitor according to claim 1, said computer monitor comprising a cathode ray tube (CRT) monitor.

4. The computer monitor according to claim 3, said CRT monitor comprising:

a monitor controller for generating two groups of control signals in response to monitor driving information supplied through the upstream port from the computer system, a first of said two groups being required to process a plurality of video signals and a second of said two groups being required to control screen and focus of the monitor;

a video signal processor for processing the video signals from the computer system via a USB cable connected between the computer system and the monitor to provide processed video signals to a plurality of electron guns of the monitor; and a horizontal/vertical synchronization signal processor for deflecting beams generated by the electron guns in response to horizontal and vertical synchronization signals supplied from the computer system via the USB cable so as to adjust the screen and focus.

5. The computer monitor according to claim 4, said monitor controller and said USB hub controller beings electrically connected together by one of an $I^2C$ (inter-integrated circuits serial interface) or a UART (universal asynchronous receiver transmitter).

6. The computer monitor according to claim 5, said USB hub controller storing and analyzing the first and second groups of control signals from the computer system so as to retransmit the control signals to the monitor controller via a protocol of the $I^2C$ or the UART.

7. The computer monitor according to claim 5, said USB hub controller further comprising a decoder for decoding digital voice information generated for a speaker, and an encoder for encoding an analog voice signal generated by a microphone.

8. The computer monitor according to claim 7, said decoder comprising a digital-to-analog converter for converting the digital voice information into an analog signal, and said encoder comprising an analog-to-digital converter for converting the analog voice signal into a digital signal.

9. The computer monitor according to claim 5, said monitor further comprising a decoder for decoding digital voice information generated for a speaker, and an encoder for encoding an analog voice signal generated by a microphone, said decoder and said encoder being disposed outside the USB hub controller.

10. The computer monitor according to claim 9, said decoder comprising a decoder for decoding the digital voice information into an analog signal.

11. The computer monitor according to claim 9, said encoder comprising an encoder for encoding the analog voice signal into a digital signal.

12. The computer monitor according to claim 5, further comprising a speaker connected to said at least one downstream port.

13. The computer monitor according to claim 12, said speaker comprising a means for converting digital voice information generated for the speaker into an analog voice signal, and a USB device connector connected to said at least one downstream port.

14. The computer monitor according to claim 5, further comprising a microphone connected to another of said at least one downstream port.

15. The computer monitor according to claim 14, said microphone comprises a means for converting an analog voice signal provided by the microphone into a digital voice signal.

16. The computer monitor according to claim 1, said power supply is controlled in accordance with a Video Electronic Standard Association (VESA) display power management system.

17. The computer monitor according to claim 1, said power supply using a DC voltage of +5 V as an operation voltage of the downstream port.

18. The computer monitor according to claim 1, said USB device comprising at least one of a group of peripheral devices composing of a keyboard, an audio system and a printer.

19. The computer monitor according to claim 1, said upstream port having two power sources and two data transmitting terminals, the two power sources having a power supply terminal and a ground terminal.

20. The computer monitor according to claim 5, said USB hub controller receiving data from the computer system over the upstream port and relaying the data to the downstream port.

* * * * *